UNITED STATES PATENT OFFICE.

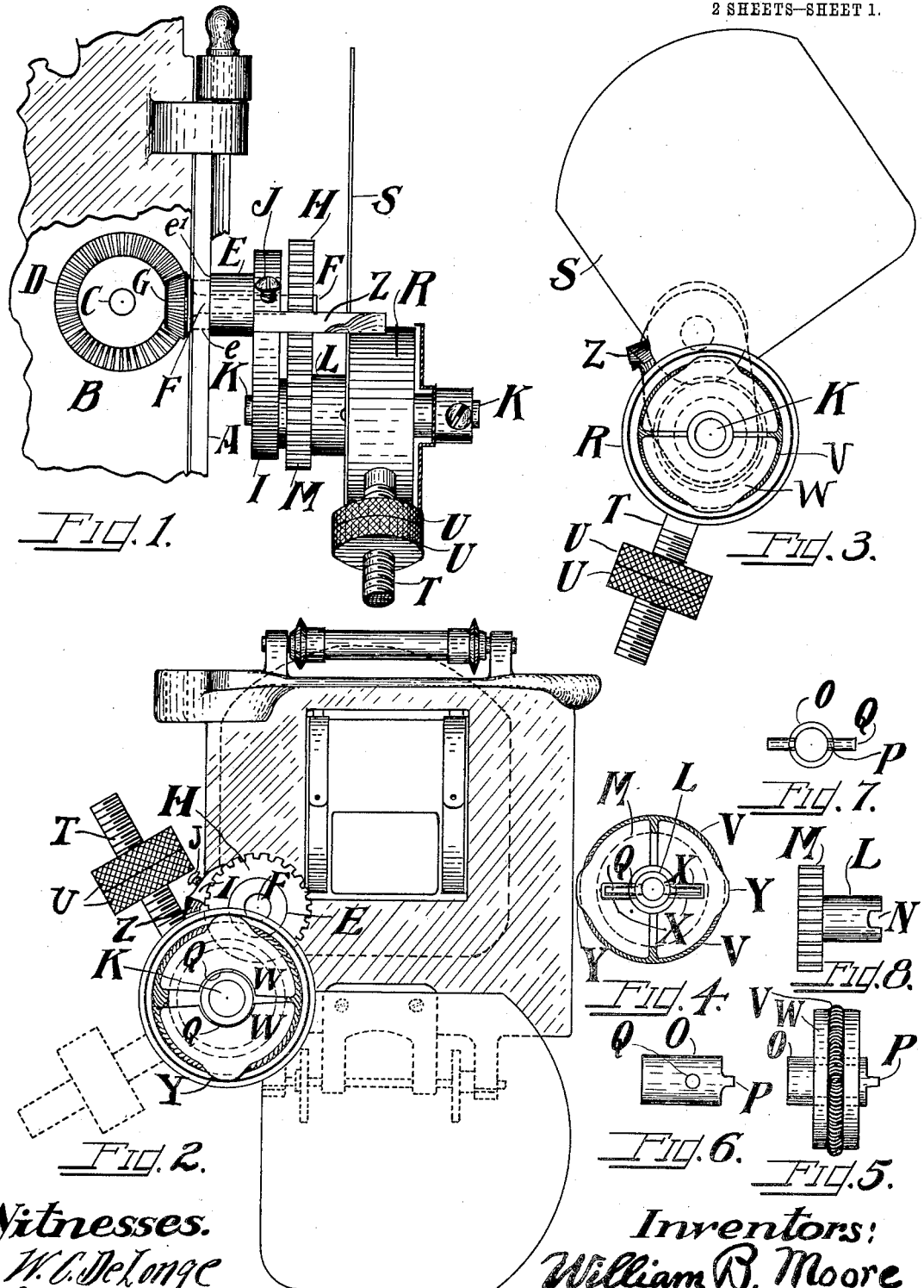

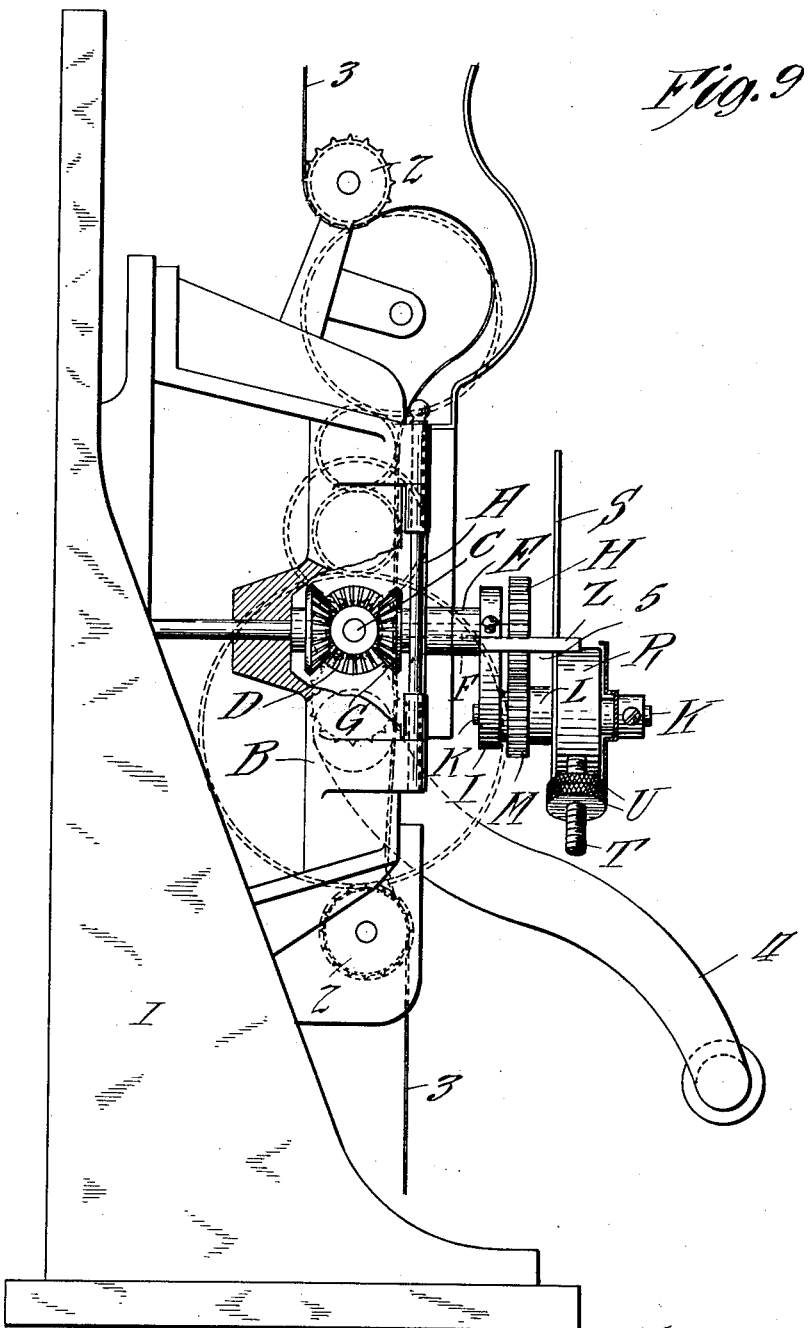

WILLIAM B. MOORE AND THOMAS H. ARMSTRONG, OF CHICAGO, ILLINOIS, ASSIGNORS, BY MESNE ASSIGNMENTS, TO THOMAS A. EDISON, INCORPORATED, OF WEST ORANGE, NEW JERSEY, A CORPORATION OF NEW JERSEY.

MOVING-PICTURE MACHINE.

1,063,207.	Specification of Letters Patent.	Patented June 3, 1913.

Application filed June 25, 1906. Serial No. 323,270.

*To all whom it may concern:*

Be it known that we, WILLIAM B. MOORE and THOMAS H. ARMSTRONG, citizens of the United States, and residents of Chicago, in the county of Cook and State of Illinois, have invented certain new and useful Improvements in Moving-Picture Machines, of which the following, when taken in connection with the drawing accompanying and forming a part hereof, is a full and complete description, sufficient to enable those skilled in the art to which it pertains to understand, make, and use the same.

This invention relates to machines to be placed in front of projecting lanterns and operated to run a film provided with a series of photographic positives therethrough and throw a series of images thereof on a curtain or screen, obtaining thereby what are known in the art as moving pictures.

To those skilled in the art it is well known that the photographic film is exposed to considerable heat produced by the light in the lantern when in the moving picture machine; that such film is made of inflammable material, and when such film is allowed to remain at rest it is set on fire, or at least injured by the heat, in a very short time. And it is the object of this invention to obtain a moving picture machine in which a screen will be automatically interposed between the photographic film and the lantern before which the machine is placed whenever the film is not in motion and automatically removed from between such film and the stereopticon lantern when such film is moving at the rate of speed required to obtain a motion picture effect therefrom on a curtain or screen.

In the drawing referred to Figure 1 is a side elevation of a portion of a moving picture machine embodying our invention, with the screen, forming an element thereof in position to be interposed between a film in the machine and the lens of the stereopticon before which the machine is placed. Fig. 2 is a rear elevation of a portion of a moving picture machine embodying this invention, showing the screen forming an element thereof removed from in front of the aperture in which the photographs of the film are exposed to the light of the stereopticon lantern, in front of which the machine is placed. Fig. 3 is an elevation of the screen and principal parts adjacent thereto of a moving picture machine embodying this invention. Fig. 4 is an elevation of weights and some of the parts adjacent thereto, which are rotatably mounted in an apparatus embodying this invention to form automatically operating screen actuating mechanism. Fig. 5 is a side elevation of the weights and some of the parts adjacent thereto which form elements in a machine embodying this invention, such weights and adjacent parts being shown in elevation in Fig. 4. Fig. 6 is a side elevation of a rotatably mounted sleeve which is used as an element to transmit motion in a machine made as we prefer to construct the apparatus embodying our invention. Fig. 7 is an end elevation of the rotatably mounted sleeve separately illustrated in Fig. 6 of the drawing. Fig. 8 is a side elevation of a sleeve and gear wheel thereon forming an element to transmit motion in the machine embodying our invention herein illustrated and described, and Fig. 9 is a side elevation, partly in section, of an Edison kinetoscope with our improved screen and screen operating means applied thereto.

A reference character applied to designate a given part is used to indicate such part throughout the several figures of the drawing wherever the same appears.

A is a door at the back of a moving picture machine provided with an aperture therein.

B is the frame of a moving picture machine. The door A is mounted on frame B by a hinge.

C (Fig. 1), is a shaft rotatably mounted in frame B.

Where a moving picture machine embodying our invention is made by attaching the several parts particularly illustrated in Figs. 1 to 8 of the drawings accompanying this specification to the machine known in the trade as the Edison universal projecting kinetoscope (as shown in Fig. 9) the balance wheel of the machine is mounted on shaft C and a beveled gear wheel D is mounted on shaft C and rigidly attached thereto to turn therewith.

E is a bearing rigidly attached to door A as by making part *e* thereof smaller than the remainder of the bearing, to obtain shoulder $e'$ and inserting such part $e$ in a corresponding hole in the door.

F is a shaft rotatably mounted in bearings E and G is a beveled gear wheel rigidly secured on shaft F to turn therewith and to engage with beveled gear D when door A is closed against frame B as illustrated in Fig. 1 of the drawing.

H is a gear wheel rigidly secured to shaft F to turn therewith.

I is a support mounted on bearing E. This support carries a lower bearing and is rigidly secured in an adjusted position by set screw J.

K is a shaft in the bearing of support I, which may be, and preferably is, non-rotatably secured in place.

L is a sleeve rotatably mounted on shaft K. Sleeve L is provided with gear wheel M rigidly secured thereon and with slots N, N, at one end thereof. O is a sleeve also mounted on shaft K. Sleeve O is provided with projections P, P, at one end and with arms Q, Q, on the sides thereof. Gear wheel M engages with gear wheel H and slots N, N, engage with projections P, P, on sleeve O.

R is a barrel loosely mounted on sleeve L.

S is a screen rigidly secured to the barrel R and T is an arm also rigidly secured to barrel R.

U, U, is a weight on arm T. We prefer to make weight U, U, in two parts or pieces and to mount them adjustably on arm T, as by means of screw threads; as such weights serve as a counter balance to hold screen S in the position thereof illustrated in Fig. 1 and indicated by broken lines in Fig. 2, when the apparatus is at rest and by so constructing the weight it can be easily adjusted to form the desired counter balance and then set to remain in such adjusted position. The weight U, U, returns screen S to its position illustrated in Figs. 1 and 3 after its movement therefrom, and also acts as a counterbalance for the screen when the latter is maintained in its open position during operation of the machine, the force tending to so maintain the screen being opposed by the weight U, U.

V is a coiled spring.

W, W, are weights loosely mounted on sleeve O and in barrel R. Spring V extends around weights W, W, yieldingly holding such weights together when sleeve O is not rotating. Weights W, W, are respectively provided with a hole or recess X (shown in Fig. 4) in which the arms Q, Q, on sleeve O extend when weights W, W, are mounted as stated, on sleeve O, and in barrel R. When sleeve O is rotated weights W, W, are turned around shaft K thereby, and when such shaft K is rotated with sufficient speed the weights W, W, are thrown out, against the barrel R (against the resiliency of spring V) so that parts Y of the weights will press on the inner peripheral surface of the barrel to turn the barrel on sleeve L (raising counter weight U, U,) and move screen S from the position thereof indicated by broken lines in Fig. 2 into the position thereof shown by the full lines in such Fig. 2. When sleeve O and weights W, W, cease to turn the weights are retracted from the barrel R by spring V and the counter weight returns barrel R and screen S to their initial position.

By the hereinbefore described mechanism when a film is in the moving picture machine and the door A is closed, the screen S is interposed between such film and the lens of the stereopticon lantern before which the machine is placed, at all times when the shaft C of the moving picture machine is not rotating, (that is, when the film is not in use and being moved), and when shaft C is turning at the right speed to properly move the film the screen S is automatically moved from in front of the film to permit the light from the stereopticon lantern to fall upon the film and project a picture therefrom on to the curtain or screen. The door A can be opened at any time in the usual way; and when closed the beveled gear wheels C and G again intermesh and the machine is in operative position.

Z is a stop on support I to limit the movement of screen S.

Referring especially to Fig. 9, reference character 1 represents generally an Edison kinetoscope provided with the usual film feeding mechanism 2 for feeding the film 3 past the projection aperture and 4 represents the crank for driving the film feeding mechanism. The frame B is provided with the shaft C rotatably mounted therein and the film gate or door A. Reference character 5 represents generally the screen and the screen operating means which are mounted on door A and constructed as hereinbefore described.

While we have shown and described an Edison universal projecting kinetoscope constructed to embody our invention we make no change in the former construction of such apparatus but simply add thereto the necessary mechanism so that the completed device will effect the purpose sought by us, in addition to the purposes heretofore sought in the making and use of such kinetoscope; and we do not confine our invention to such kinetoscope as the mechanism herein specifically shown and described, or its mechanical equivalent, may be combined with any other form of moving picture machine.

Sleeves L and O may be joined to form a single sleeve having gear wheel M on one end thereof and projections Q, Q, thereon near the other end thereof. In such case in assembling the several parts the weights W, W, may be placed on the sleeve, such sleeve then inserted through the hole in the rear wall of barrel R and the gear wheel M then forced on to the end of the sleeve. We prefer to make the sleeve in two parts so that the same may be assembled or taken apart at any time by the user.

Having thus described our invention what we claim as new and desire to secure by Letters Patent, is—

1. In a moving picture machine, the combination of a main frame provided with means for imparting a progressive movement to a film, a door hinged thereto, a movable screen carried on said door, and means under the control of the film moving mechanism operable to move said screen when the door is closed and inoperative for this purpose when the door is open, substantially as set forth.

2. In a moving picture machine, the combination of a main frame provided with film moving mechanism, a door hinged thereto, a movable film protecting screen on said door and centrifugal means for moving said screen engaged with and operable from the film moving mechanism only when the door is closed, substantially as set forth.

3. In a moving picture machine, the combination of a main frame provided with film moving mechanism, a door hinged thereto, a movable screen on said door, and means for moving said screen located partly on the frame and partly on the door, the parts thereof being operatively positioned with respect to one another only when the door is closed, substantially as set forth.

4. In a moving picture machine, the combination of a main frame provided with film moving mechanism, a door hinged thereto, a movable screen on said door and mechanical means for moving said screen controlled by the film moving mechanism and located partly on the frame and partly on the door, the said parts being so situated relative to one another as not to interfere with the opening of the door, substantially as set forth.

5. In a moving picture machine, the combination of a main frame provided with means for imparting a progressive movement to a film, a door hinged to said frame, and having an exposure opening therein, a movable screen arranged to extend normally across said opening, and adjacent thereto, a revoluble shaft supported in said frame, mechanical means connecting said screen to said shaft to cause said screen to be moved away from said opening when said shaft is rotated, said mechanical means and said screen being constructed and arranged so as not to interfere with the opening of said door.

6. In a moving picture machine, the combination of a main frame provided with film moving mechanism, a door hinged thereto, a movable screen on said door, and means for moving said screen controlled by the film moving mechanism and located partly on the frame and partly on the door, the parts thereof being operatively positioned with respect to one another only when the door is closed and so situated relative to one another as not to interfere with the opening of the door, substantially as set forth.

7. In a moving picture machine, the combination with a main frame provided with film moving mechanism, of a door hinged thereto, a screen rotatably mounted on said door, an actuating member for said screen on said frame and a coöperating screen actuating device on said door, the said member and device being arranged to be moved into and out of coöperative relation according as the door is closed or opened, substantially as set forth.

8. In a moving picture machine, the combination of a main frame provided with film moving mechanism, a door hinged thereto, a movable screen on said door and means for operating said screen comprising a member upon the frame actuated from the film moving mechanism, and a screen actuating device on the door which is brought into coöperative relation with said member by closing the door and is moved out of coöperative relation therewith by opening the door, substantially as set forth.

9. In a moving picture machine, the combination of a main frame provided with film moving mechanism, a door hinged thereto, a movable shutter on said door adapted when said film moving mechanism is at rest to cut off the projecting light from the film and centrifugal means on said door for moving said screen, the said centrifugal means being adapted to be operated from the film moving mechanism only when the door is closed, substantially as set forth.

10. In a moving picture machine, the combination of a main frame provided with film moving mechanism, a door hinged thereto, the film passing between the frame and door, a movable shutter on said door adapted when at rest to cut off the projecting light from the film, and centrifugal means on said door for moving said screen, the said centrifugal means being operated from the film moving mechanism, substantially as set forth.

11. In a moving picture machine, the combination of a main frame provided with film moving mechanism, a door hinged thereto, a movable screen on said door, a centrifugal device on said door and connected with said screen, and means for gearing the centrifugal device to the film moving mechanism when the door is closed, the said mechanism being thrown out of gear when the door is open, substantially as set forth.

12. In a moving picture machine, the combination of a main frame provided with mechanism for moving the film along one side thereof, a door hinged to the frame and adapted to coöperate with the frame to provide a passage for the film, a movable screen on said door adapted normally to cut off the projecting light from said film, a mechanical actuating means for said screen located partly on the frame and partly on the door, the said parts being so disposed relative to one another as not to interfere with the opening of the door, substantially as set forth.

13. In a moving picture machine, the combination of a main frame provided with film moving mechanism and having a light aperture over which the film is passed, a door hinged to said frame and having an aperture in line with the aperture in the frame, a movable film protecting screen on said door and normally closing the said opening therein, means partly on said door and partly on said frame and frictionally actuated from the film moving mechanism to move the said screen from over said aperture when the door is closed, the said means being so arranged as not to interfere with the opening of the door and being rendered inoperative to actuate the screen when the door is open, and means for returning the screen to its normal position when the movement of the film moving mechanism is slowed down or stopped, substantially as set forth.

14. In a moving picture machine, a rotatable shaft, a gear wheel on such shaft, a rotatable sleeve, a gear wheel on the rotatable sleeve arranged to engage with the first named gear wheel, a loosely mounted barrel, rotatably mounted weights within the barrel, means to yieldingly hold the weights in a retracted position when such weights are not rotating, a connection between the rotatable sleeve and the weights to rotate such weights on the rotation of such sleeve and thereby project the weights from their retracted position, a screen, a connection between the screen and the barrel, means to hold such screen in a determined initial position, such barrel and weights arranged to obtain a connection between them when the weights are projected to move the screen from its initial position.

15. In a moving picture machine, a rotatable shaft, a gear wheel on such shaft, an additional shaft, gear wheels on such additional shaft, a rotatable sleeve and a gear wheel on such rotatable sleeve, one of such gear wheels on the additional shaft arranged to engage with the first named gear wheel and the other of such gear wheels arranged to engage with the gear wheel on the rotatable sleeve, a loosely mounted barrel, rotatably mounted weights within the barrel, means to yieldingly hold the weights in a retracted position when such weights are not rotating, a connection between the rotatable sleeve and the weights to rotate such weights on the rotation of such sleeve and thereby project the weights from their retracted position, a screen, a connection between the screen and the barrel, means to hold such screen in a determined initial position, such barrel and weights arranged to obtain a connection between them when the weights are projected to move the screen from its initial position; substantially as described.

16. In a moving picture machine, a rotatable shaft, a gear wheel on such shaft, an additional shaft, gear wheels on such additional shaft, a rotatable sleeve and a gear wheel on such rotatable sleeve, one of such gear wheels on the additional shaft arranged to engage with the first named gear wheel and the other of such gear wheels arranged to engage with the gear wheel on the rotatable sleeve, a loosely mounted barrel, rotatably mounted weights, provided respectively with recesses, within said barrel, a spring to yieldingly hold the weights in a retracted position when such weights are not rotating, projections on the rotatable sleeve arranged to loosely fit in the recesses in the rotatably mounted weights, to rotate such weights on the rotation of such sleeve and thereby project the weights from their retracted position, a screen, a connection between the screen and the barrel, means to hold such screen in a determined initial position, such barrel and weights arranged to obtain a connection between them when the weights are projected to move the screen from its initial position; substantially as described.

17. In a moving picture machine, a rotatable shaft, a gear wheel on such shaft, an additional shaft, gear wheels on such additional shaft, a rotatable sleeve and a gear wheel on such rotatable sleeve, one of such gear wheels on the additional shaft arranged to engage with the first named gear wheel and the other of such gear wheels arranged to engage with the gear wheel on the rotatable sleeve, an additional sleeve engaging with the first named sleeve, arms on the additional sleeve, a loosely mounted barrel, rotatably mounted weights provided, respectively, with a recess, within the barrel, a spring to yieldingly hold the weights in a retracted position when such weights are not rotating, the arms on the additional sleeve arranged to loosely fit in the recesses in the rotatably mounted weights, to rotate such weights on the rotation of such sleeve and thereby project the weights from their retracted position, a screen, a connection between the screen and the barrel, means to hold such screen in a determined initial position, such barrel and weights arranged to obtain a connection between them when the weights are projected to move the screen from its initial position; substantially as described.

18. In a moving picture machine, a rotatable shaft, a barrel, rotatably mounted weights, a connection between the rotatable shaft and the weights to rotate such weights on the rotation of such shaft and thereby project the weights against the barrel, a screen, means to yieldingly hold such screen in a determined initial position, such screen, barrel, and weights arranged to obtain a connection between them when the weights are projected to move the screen from its initial position; substantially as described.

19. In a moving picture machine, a rotatable shaft, a barrel, rotatably mounted weights, a connection between the rotatable shaft and the weights to rotate such weights on the rotation of such shaft and thereby project the weights against the barrel, a screen, such screen, barrel and weights arranged to obtain a connection between them when the weights are projected to move the screen from its initial position, substantially as described.

20. In a moving picture machine, a rotable shaft, a gear wheel on such shaft, a rotatable sleeve, a gear wheel on the rotatable sleeve arranged to engage with the first named gear wheel, a loosely mounted barrel, rotatably mounted weights within the barrel, a connection between the rotatable sleeve and the weights to rotate such weights on the rotation of such sleeve and thereby project the weights against the barrel, a screen, a connection between the screen and the barrel, means to hold such screen in a determined initial position, such barrel and weights arranged to obtain a connection between them when the weights are projected to move the screen from its initial position; substantially as described.

21. In a moving picture machine, the combination of a movably mounted screen, a friction member operatively connected to said screen, a second friction member having one or more friction surfaces centrifugally movable into engagement with said first member and means for rotating said second friction member.

22. In a moving picture machine, the combination of a movably mounted screen, a friction member operatively connected to said screen, a centrifugal member, means movable thereby into frictional engagement with said friction member and means for rotating said centrifugal member.

23. In a moving picture machine, the combination of a shutter and friction member mounted on a shaft, a second friction member having one or more friction surfaces centrifugally movable into engagement with said first member, and means for rotating said second friction member.

24. In a moving picture machine, the combination of a movable screen, a shaft, a hollow cylindrical member loose on said shaft and adapted when rotated to impart movement to said screen, a weight within the said cylindrical member and rotatable with said shaft and a spring normally holding said weight to said shaft, substantially as set forth.

25. In a moving picture machine, the combination of a movable screen, a shaft, a hollow cylindrical member loose on said shaft and adapted when rotated to impart movement to said screen, and a weight within the said cylindrical member and rotatable with said shaft.

26. In a moving picture machine, the combination of a movable screen, a shaft, a hollow cylindrical member loose on said shaft and adapted, when rotated, to impart movement to said screen, and a friction member inside said cylindrical member and connected to said shaft and constructed and arranged to engage frictionally the interior of said cylindrical member.

27. In a moving picture machine, the combination of a rotatable screen, means to yieldingly hold said screen in a position to cut off the projecting rays from the film, a shaft, a hollow cylindrical member loose on said shaft, and adapted when rotated to impart rotation to said screen, and a centrifugal device within the said cylindrical member rotatable with the said shaft and adapted when the shaft is rotated to frictionally engage the said cylindrical member, substantially as set forth.

28. In a moving picture machine, the combination of a movable screen, a shaft, a hollow cylindrical member loose on said shaft, and adapted when rotated to move said screen, and a centrifugal device within the said cylindrical member rotatable with the said shaft and adapted when the shaft is rotated to frictionally engage the said cylindrical member, substantially as set forth.

29. In a moving picture machine, the combination of a frame provided with film moving mechanism, a film protecting screen, a shaft, a member loose on said shaft and adapted when rotated to impart movement to said screen, means for connecting said shaft and member frictionally when the shaft is rotated, and means for holding said screen in its closed position when the said shaft is at rest and returning the same to its position of rest after the cessation of any movement of said shaft, substantially as set forth.

30. In a moving picture machine, the combination of a frame provided with film moving mechanism, a film protecting screen, a shaft, a member loose on said shaft and adapted when rotated to impart movement to said screen, means for connecting said shaft and member frictionally when the shaft is rotated, and means for holding said screen in its closed position when the said shaft is at rest and partially counterbalancing the same and the force exerted through said connecting means thereon when the shaft is rotated, substantially as described.

31. In a moving picture machine, the combination of a frame, an apertured plate mounted on said frame, an apertured door mounted on said plate, a shield mounted on said door and normally positioned to close the aperture in said door to normally prevent the passage of the light ray, revoluble means for feeding a picture film between said door and plate, a centrifugal clutch adapted to be operated by said feeding means, and a connection between said clutch and said shield whereby said shield will be removed from the path of the light ray when the feeding mechanism has attained a predetermined speed, substantially as set forth.

32. In apparatus of the class described, a movable screen, a revoluble shaft, mechanism whereby said screen is connected with said shaft, devices whereby said mechanism is clutched and unclutched in relation to said shaft, a handle, mechanism through which said handle operates said devices, film feeding mechanism, and gearing operated by said handle for operating said feeding mechanism.

33. In apparatus of the class described, a movable screen, a revoluble shaft, mechanism whereby said screen is connected with said shaft, centrifugally operated devices whereby said mechanism is clutched and unclutched in relation to said shaft, a handle, mechanism through which said handle operates said devices, film feeding mechanism, and gearing operated by said handle for operating said feeding mechanism.

34. In apparatus of the class described, a movable screen, a revoluble shaft, mechanism whereby said screen is connected with said shaft, centrifugally operated devices whereby said mechanism is clutched and unclutched in relation to said shaft, and means for revolving said shaft and operating said devices.

35. In apparatus of the class described, a movable screen, a rotatable shaft, means to rotate said shaft, mechanism whereby said screen is connected with said shaft, said mechanism including a pair of friction devices normally out of operative relation with each other and constructed and arranged to be moved into operative relation when said shaft is rotated.

36. The combination with a rotary shaft of a moving picture machine of a swinging member, a governor arranged to be revolved at a high rate of speed by said shaft and having governor weights adapted to frictionally connect the swinging member with the governor, a light shield so connected to said swinging member that said light shield is moved out of its closed position whenever the swinging member is moved by the governor.

37. In a moving picture machine, a rotating shaft, a centrifugal governor arranged to be rotated at a high rate of speed by said shaft, a swinging member mounted to turn about an axis extending in the same general direction as the axis of rotation of said governor, a portion of said governor being arranged to engage and turn said swinging member when said governor attains a predetermined speed, and a light shield operatively connected to said swinging member and arranged to be moved when said swinging member moves.

38. The combination with a rotary shaft of a moving picture machine, of a swinging member, a governor arranged to be revolved at a high rate of speed by said shaft and having governor weights adapted to frictionally connect the swinging member with the governor, a light shield and connections between the light shield and swinging member arranged to move said light shield out of its closed position whenever the swinging member is moved by the governor.

39. In a moving picture machine having a main frame provided with film driving mechanism including a gear, the combination with a gate or auxiliary frame adapted to be hinged to the main frame, of a movable shutter, and centrifugal mechanism for operating the shutter including a gear, the said shutter, centrifugal mechanism and gear being mounted on and carried by the said gate, and the gear of the centrifugal mechanism being adapted and located to mesh with the gear of the film driving mechanism when the gate is in closed position, substantially as described.

40. In a moving picture machine, the combination of a main frame provided with driving means for imparting a progressive movement to a film, an auxiliary frame or gate hinged thereto, a movable shutter carried by said gate and adapted to cut off the projecting light from the film, and centrifugal means operated by said driving means and comprising an outwardly movable weight or weights for operating said shutter.

41. In a moving picture machine, the combination of a main frame provided with driving means for imparting a progressive movement to a film, an auxiliary frame or gate hinged thereto on a vertical axis, a movable shutter carried by said gate and adapted to cut off the projecting light from the film, and centrifugal means operated by said driving means comprising outwardly movable weights for operating said shutter.

42. In a moving picture machine, the combination of a main frame provided with driving means for imparting a progressive movement to a film, an auxiliary frame or gate hinged thereto on a vertical axis, a shutter carried by said gate and adapted to cut off the projecting light from the film, said shutter being movable on a horizontal axis and centrifugal means operated by said driving means, comprising outwardly movable weights for operating said shutter.

WILLIAM B. MOORE.
THOMAS H. ARMSTRONG.

In the presence of—
C. A. ADAMS,
CHARLES TURNER BROWN.